United States Patent Office 3,239,321
Patented Mar. 8, 1966

3,239,321
DIAMOND ABRASIVE PARTICLES IN A
METAL MATRIX
Alan Blainey and Jan F. H. Custers, both c/o Adamant
Research Laboratory, Crown Mines, Johannesburg,
Transvaal, Republic of South Africa
No Drawing. Filed Nov. 29, 1963, Ser. No. 327,122
Claims priority, application Republic of South Africa,
July 22, 1960, 3,014/60
2 Claims. (Cl. 51—309)

This application is a continuation-in-part of application Serial No. 123,117, filed July 11, 1961, and now abandoned.

This invention relates to a method of forming abrasive bodies and bodies formed by the method.

Attempts have been made to form diamond dust and other fine diamond particles into compacts which would approach in quality naturally occurring polycrystalline diamond aggregates known as framesite.

One such approach has been along the lines of bonding the diamonds with glasses of various types, but this approach does not lead to anything approaching the desired result.

It has also been suggested that the techniques applicable to the making of diamond tools such as dressing tools, bits, drills, diamond wheels, saws, dies and the like would lead to good results. In all cases, conventional techniques have fallen short of the mark.

The present invention is concerned with another attempt towards attaining the ideal, which is something like or better than framesite. Although the attempts have not been successful to the extent that in all cases the qualities of framesite have been achieved, a valuable method of using diamond dust has nevertheless been provided.

An object of the invention is firstly to achieve a compact in which the diamond particles are graphite free. Obviously graphite has not the same qualities as diamond. Graphite formation on diamond surfaces is almost inevitable when one heats a diamond at ambient pressures to above the graphitization temperature. It also appears that certain metals catalyze the formation of graphite.

Secondly, an object of the invention is to achieve a compact in which the surface of the diamond is free from oxygen which impairs both mechanical and chemical bonding between the diamond and the matrix.

Thirdly, it is necessary that the compact and hence the matrix has adequate mechanical strength.

Another object of the invention is to provide an abrasive body consisting in a shaped compact compounded of graphite free diamond particles embedded in a matrix material which forms a bond with diamond, is a good oxygen getter and has adequate mechanical strength.

A further object of the invention is to provide a method of making a compact of the above description.

The matrix materials that have been found to give the best results in practice are from the fourth, fifth and sixth groups of the periodic system. Metals which have the characteristics of forming a strong bond with carbon, and being good oxygen getters and having an adequate mechanical strength, while at the same time being reasonably freely available and not exhorbitantly expensive, are titanium, vanadium, zirconium, chromium and silicon, in this order of preference for pure metals, alloys of these principal metals with nickel, manganese, iron and other metals serving to lower their melting points, again in order of preference, and admixtures of the principal metals, of which mixtures of titanium and silicon give the most outstanding results.

The proportion of matrix metal in the compact is important. In general, there should be enough metal to fill the voids between the diamond particles in the finished compact. The amount by volume should be sufficient to fill the voids in a compacted, but not unduly fragmented, mass of diamonds and not more than is necessary to fill the voids when the particles are loose. Of course, one may, if one so wishes, increase the amount of binder but then the advantages of the invention become diluted.

The method by which the compact is made consists in the following steps:

(a) Mixing the requisite amount of diamonds with the requisite amount of a suitable matrix metal;

(b) Subjecting the mixture to an elevated pressure at which graphitization of the diamond is inhibited;

(c) Heating the mixture while the pressure is on to cause the matrix to become molten;

(d) Allowing the mixture to cool while the pressure is on;

(e) Releasing the pressure only after a temperature below the graphitization temperature of diamond at ambient pressure has been reached.

A wide range of pressures may be used. The lower limit of pressure has been found to be about 20 kilobars. In practice an upper limit of 76 kilobars has been used. While higher pressures could be used, it would appear that no advantage would accrue from any increase of pressure above 76 kilobars.

As said above, the melting point of the matrix under the pressures used is the lower limit of the temperature to which the mixture may be heated. The upper limit, although this is seldom attainable, is the graphitization temperature of diamond under the applied elevated pressure. In practice, a range of between 1400–2000° C. has given adequate results with all metals tested.

Since graphitization also appears to be a function of time, the shorter the time during which the mixture is at the maximum temperature, the better. With the equipment available to the applicants, a period of two minutes was the shortest time that could be used and all experiments were limited to this period.

It does not appear that the size of the metal particles that are used is critical, but it is preferred to use metal particles that are not coarser than the diamond particles that are being bonded.

*Examples*

A series of tests were conducted to make compacts according to the invention. The salient features of the tests are set out in the annexed Tables I and II, in which Table I sets out examples containing pure metals; and Table II sets out examples of various alloys.

In all cases, metal in powder form was added to the diamond particles and the whole thoroughly mixed until completely homogeneous. The mixture was then tamped into a graphite heating tube of a high pressure assembly similar to that used in diamond synthesis. The graphite tube has end plugs of graphite backed by thermally insulating plugs of wonderstone. Plugs of graphite and wonderstone are placed at the bottom end, and the mixture is tamped into the tube to obtain maximum possible packing density, whilst avoiding fracture of graphite tubes. The top plugs of wonderstone and graphite are then inserted and the whole is assembled in any suitable high pressure high temperature equipment such as that described for diamond synthesis.

The procedure in using the equipment is as follows:

(a) The pressure is first raised to the value given for compacting pressure in the tables;

(b) Immediately thereafter, the temperature is raised to the value given under compacting temperature;

(c) The temperature is held for two minutes and heating then discontinued;

(d) When the temperature of the formed mass has fallen to about 200° C., the pressure is released.

The formed compact was now removed and evaluated. The abrasion resistance was evaluated by holding formed compacts against identical rotating alundum grinding wheels under identical conditions of peripheral speed and feed. The amount of wear on the compacts was taken as a measure of abrasion resistance.

In most cases, the formed compact is extremely hard and compares favourably with natural framesite.

The compact may be suitably shaped and mounted for cutting and abrading hard materials. One advantage is that the compact may be shaped by electro-erosion, since it conducts electricity.

In the above examples, i.e. examples Nos. 1 to 25 in the attached tables, the diamond particles used were synthetic diamond particles as received from the manufacturer and they were known to be clean. In cases where the diamonds are not known to be clean, they first have to be cleaned by processes which are well-known.

In the attached tables, the percentage by volume of the matrix when it is given as 31.5% represents the optimum amount of bonding material to fill the voids between the particles. This percentage has been determined by test.

*Example 26*

In this example graded natural diamond powder is used with a view to avoiding large interstitial spaces not occupied by diamond material. The graded diamond powder consists of 80.5% of 15–30 micron particles, 16.5% of 4–8 micron particles and 3% of ½–1½ micron particles, and is mixed with silicon powder of 0.1–5 micron particle size in the proportion of 73–86% (preferably 78%) by volume graded diamond powder and 14–27% (preferably 22%) by volume silicon.

The powders are thoroughly mixed until completely homogeneous, and then tamped into a graphite heating tube of a high pressure assembly similar to that used in diamond synthesis. The graphite tube has end plugs of graphite backed by thermally insulating plugs of wonderstone. Plugs of graphite and wonderstone are placed at the bottom end, and the powder is tamped into the tube to obtain maximum possible packing density, whilst avoiding fracture of the graphite tube. The top plugs of wonderstone and graphite are then inserted, and the whole is assembled in any suitable high pressure high temperature equipment such as that recently described for diamond synthesis.

The pressure is raised to about 45,000 atmospheres (300 tons/sq. in.) and the temperature of the powder mass raised to a value in the range 1500°–1900° C., preferably 1750°–1800° C., for 2–4 (preferably 3) minutes, by means of a heavy electric current passed through the graphite heating tube. Heating is now discontinued and the temperature of the formed mass allowed to fall to about 200° C. before removing the pressure.

In a number of experiments according to this example, the results remained inconsistent. Some were about a third as good as Example 1 and others much worse.

In the compacts of the invention, the diamond is bonded to the matrix in the sense that fractures are not preferentially propagated along the diamond-matrix inter faces. It is believed that the bond is a chemical one, but the possibility of a physical or physico-chemico bond cannot be excluded.

TABLE I

| Example No. | Elements— Pure Metals | Matrix, percent by volume | Diamond particle, mesh size range | Compacting pressure (Kb) | Compacting temperature (° C.) | Remarks on properties of compact |
|---|---|---|---|---|---|---|
| 1 | Vanadium | 31.5 | 100/200 | 76 | 1,500 | Pure metal compact with greatest abrasion resistance. |
| 2 | Chromium | 31.5 | 100/200 | 66 | 1,430 | Only one quarter as good as No. 1, but equal to Framesite. |
| 3 | Titanium | 31.5 | 100/200 | 76 | 1,570 | Almost as good as No. 2. |
| 4 | Silicon | 22 | −325 | 42 | 1,500 | Only one-twelfth as good as No. 1. |
| 5 | Zirconium | 31.5 | 100/200 | 76 | 1,570 | Only one tenth as good as No. 1. |
| 6 | Titanium | 31.5 | 200/325 | 76 | 1,500 | About as good as No. 5, but utilises finer diamond powder. |
| 7 | Vanadium | 31.5 | 200/325 | 76 | 1,500 | Very abrasion resistant in parts, but not uniform. |
| 8 | Titanium | 31.5 | −325 | 76 | 1,500 | Inferior to No. 7 in abrasion resistance, but more uniform. |

TABLE II

| Example No. | Elements—Alloys | Alloy composition | Matrix, percent by volume | Diamond particle, mesh size range | Compacting pressure (Kb) | Compacting temperature (° C.) | Remarks on properties of compact |
|---|---|---|---|---|---|---|---|
| 9 | Titanium/silicon | 34.4/3.2 | 31.5 | 100/200 | 50 | 1,500 | 50% better than No. 1, the most abrasion resistant of all. |
| 10 | Zirconium/cobalt | 41.1/8.3 | 31.5 | 100/200 | 76 | 1,430 | Only one third as good as No. 9. |
| 11 | Titanium/zirconium | 50/50 | 31.5 | 100/200 | 76 | 1,500 | One quarter as good as No. 9. |
| 12 | Titanium/nickel | 37.5/2.5 | 31.5 | 100/200 | 76 | 1,430 | Similar to No. 10 on average, but some compacts better. |
| 13 | do | 34/6 | 31.5 | 100/200 | 76 | 1,430 | Similar to No. 10. |
| 14 | Titanium/iron | 28.8/13.6 | 31.5 | 100/200 | 76 | 1,430 | Inferior to No. 10. |
| 15 | Titanium/chromium | 23.3/20.7 | 31.5 | 100/200 | 76 | 1,430 | Inferior to No. 14, but better than some Framesite. |
| 16 | Zirconium/manganese | 38.2/10.4 | 31.5 | 100/200 | 76 | 1,430 | Similar to No. 15. |
| 17 | Titanium/cobalt | 30.5/11.9 | 31.5 | 100/200 | 76 | 1,430 | |
| 18 | Titanium/silicon | 34.4/3.2 | 31.5 | 200/325 | 50 | 1,500 | Abrasion resistance equivalent to average of several Framesite samples. |
| 19 | Titanium/chromium | 23.3/20.7 | 31.5 | 200/325 | 76 | 1,360 | Only about half as good as No. 18. |
| 20 | Titanium/nickel | 37.5/2.5 | 31.5 | 200/325 | 76 | 1,430 | |
| 21 | Titanium/zirconium | 50/50 | 31.5 | 200/325 | 76 | 1,430 | Inferior to Nos. 19 and 20. |
| 22 | Titanium/silicon | 34.4/3.2 | 31.5 | −325 | 50 | 1,500 | These materials inferior to Nos. 19 and 20 but utilise the finest diamond powders. |
| 23 | Titanium/chromium | 23.3/20.7 | 31.5 | −325 | 76 | 1,360 | |
| 24 | Titanium/nickel | 37.5/2.5 | 31.5 | −325 | 76 | 1,360 | |
| 25 | Titanium/zirconium | 50/50 | 31.5 | −325 | 76 | 1,500 | |

We claim:

1. An abrasive body consisting in a shaped compact compounded of substantially graphite-free diamond particles uniformly distributed and embedded in a lesser volume of a matrix consisting essentially of vanadium, the matrix occupying at least substantially all of the interstitial space between the diamond particles.

2. An abrasive body consisting in a shaped compact compounded of substantially graphite-free diamond particles uniformly distributed and embedded in a lesser volume of a matrix consisting essentially of an alloy of titanium and silicon, the proportions of titanium to silicon being about 34.4:3.2, the matrix occupying at least substantially all of the interstitial space between the diamond particles.

References Cited by the Examiner

UNITED STATES PATENTS

| | | | |
|---|---|---|---|
| 2,068,848 | 1/1937 | De Bats | 51—307 |
| 2,077,345 | 4/1937 | Van der Pyl | 51—309 |
| 2,240,829 | 6/1941 | Bevillard | 51—309 |
| 2,703,750 | 3/1955 | Cotter | 51—309 |
| 2,712,988 | 7/1955 | Kurtz | 51—309 |
| 2,947,609 | 8/1960 | Strong | 23—209.1 |
| 3,101,260 | 8/1963 | Cheney | 51—309 |
| 3,141,746 | 7/1964 | De Lai | 51—309 |

ALEXANDER H. BRODMERKEL, *Primary Examiner.*

D. J. ARNOLD, *Assistant Examiner.*